US012385312B2

(12) United States Patent
Rehm et al.

(10) Patent No.: US 12,385,312 B2
(45) Date of Patent: Aug. 12, 2025

(54) SPINDLE DRIVE

(71) Applicant: Brose Fahrzeugteile GmbH & Co. Kommanditgesellschaft, Bamberg, Bamberg (DE)

(72) Inventors: Nadja Rehm, Coburg (DE); Michael Buchheim, Bamberg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 1041 days.

(21) Appl. No.: 16/482,968

(22) PCT Filed: Dec. 12, 2017

(86) PCT No.: PCT/EP2017/082373
§ 371 (c)(1),
(2) Date: Aug. 1, 2019

(87) PCT Pub. No.: WO2018/141446
PCT Pub. Date: Aug. 9, 2018

(65) Prior Publication Data

US 2020/0232267 A1 Jul. 23, 2020

(30) Foreign Application Priority Data

Feb. 3, 2017 (DE) ..................... 10 2017 102 173.6

(51) Int. Cl.
*E05F 15/622* (2015.01)
*E05F 1/10* (2006.01)

(52) U.S. Cl.
CPC .......... *E05F 15/622* (2015.01); *E05F 1/1058* (2013.01); *E05Y 2201/26* (2013.01);
(Continued)

(58) Field of Classification Search
CPC ........ B60J 5/0472; B60J 5/102; E05F 15/622; E05F 1/1058
See application file for complete search history.

(56) References Cited

U.S. PATENT DOCUMENTS 5,628,496 A * 5/1997 Chamberlin ............ F16F 9/368 188/269
7,681,469 B2 3/2010 Ritter
(Continued)

FOREIGN PATENT DOCUMENTS

DE 202007015597 3/2009
DE 102007048539 7/2009
(Continued)

OTHER PUBLICATIONS

"International Preliminary Report on Patentability," for PCT Application No. PCT/EP2017/082373 mailed Aug. 6, 2019 (22 pages), with English translation.
(Continued)

*Primary Examiner* — Gregory J Strimbu
(74) *Attorney, Agent, or Firm* — Pauly, DeVries Smith & Deffner LLC

(57) ABSTRACT

A spindle drive for a closure element of a vehicle for generating drive movements along a geometric spindle axis, having a tube-like drive housing and a spindle unit with a spindle guide bush and a spindle movably mounted therein are provided, a first drive connection and a second drive connection which is linearly displaceable with respect to the latter being provided to generate the drive movements, a spindle guide tube being connected to the first drive connection and, together with the first drive connection, forming a first drivetrain component which is connected to the spindle guide bush of the spindle unit, and a connecting element being connected to the second drive connection and forming a second drivetrain component which is connected
(Continued)

to the spindle. The spindle can be mounted in the spindle guide bush in such a way that it is purely linearly movable in the spindle guide bush.

17 Claims, 5 Drawing Sheets

(52) U.S. Cl.
CPC ..... *E05Y 2201/70* (2013.01); *E05Y 2800/232* (2013.01); *E05Y 2900/531* (2013.01); *E05Y 2900/546* (2013.01); *E05Y 2900/548* (2013.01)

(56) References Cited

U.S. PATENT DOCUMENTS

| | | | | |
|---|---|---|---|---|
| 2007/0096377 | A1 * | 5/2007 | Hanna | E05F 15/652 267/226 |
| 2007/0261306 | A1 * | 11/2007 | Hanna | E05F 15/622 49/52 |
| 2007/0296243 | A1 * | 12/2007 | Borrmann | E05F 15/622 296/146.4 |
| 2009/0000201 | A1 * | 1/2009 | Fahl | E05F 15/622 49/280 |
| 2009/0120003 | A1 | 5/2009 | Bochen et al. | |
| 2015/0069869 | A1 * | 3/2015 | Loeffler | E05F 1/1041 310/80 |
| 2016/0177612 | A1 * | 6/2016 | Buchheim | E05F 15/622 296/50 |
| 2016/0312514 | A1 * | 10/2016 | Leonard | F16H 25/2454 |
| 2018/0216390 | A1 * | 8/2018 | Takizawa | F16H 1/32 |

FOREIGN PATENT DOCUMENTS

| | | |
|---|---|---|
| DE | 102014117008 | 5/2016 |
| DE | 202016105991 | 1/2018 |
| EP | 2196701 | 6/2010 |
| JP | 2014101637 | 6/2014 |
| JP | 2016532036 | 10/2016 |
| TW | 566465 | 12/2003 |
| WO | 2018141446 | 8/2018 |

OTHER PUBLICATIONS

"International Search Report and Written Opinion," for PCT Application No. PCT/EP2017/082373 mailed Jul. 11, 2018 (28 pages), with English translation.

* cited by examiner

SPINDLE DRIVE

CROSS-REFERENCE TO RELATED APPLICATIONS

This application is a national stage application under 35 U.S.C. 371 of International Patent Application Serial No. PCT/EP2017/082373, entitled "Spindle Drive," filed Dec. 12, 2017, which claims priority from German Patent Application No. DE 10 2017 102 173.6, filed Feb. 3, 2017, the disclosure of which is incorporated herein by reference.

FIELD OF THE TECHNOLOGY

The disclosure relates to a spindle drive for a closure element of a motor vehicle, to a corresponding spindle drive and to a drive arrangement for a closure element of a motor vehicle.

BACKGROUND

The spindle drive in question and the drive arrangement in question are used in the context of the motorized adjustment of a closure element of a motor vehicle. Such closure elements can be, for example, doors, in particular sliding doors, or flaps, in particular tailgates, trunk lids, engine hoods, luggage compartment floors or the like, of a motor vehicle. In this respect, the term "closure element" is to be understood in broad terms in the present case.

For the motorized adjustment of a tailgate of a motor vehicle, it is known practice to provide one or two spindle drives (DE 10 2014 117 008 A1) in the edge region of a tailgate opening, each of said spindle drives having a tube-like drive housing and, in the drive housing, a spindle unit in the form of a spindle/spindle nut mechanism which has, as mechanism partners, a spindle and a spindle guide bush in the form of a spindle nut. Also accommodated in the drive housing is a drive unit with a drive motor which drives the spindle to rotate, possibly via an intermediate gear mechanism. By virtue of a screw engagement between spindle and spindle nut, the spindle nut and a spindle guide tube connected thereto are thereby moved axially along the geometric spindle axis relative to the spindle. This generates a linear drive movement along the geometric spindle axis between two drive housing parts and drive connections connected thereto, which in turn brings about opening or closing of the closure element, for example the tailgate.

For cost reasons, inter alia, it is frequently the case that only one individual motor-operated spindle drive as defined above is provided as so-called "active side", said spindle drive being arranged on one of the edge regions of the flap opening. In order to balance out a tailgate and reduce the load on the individual spindle drive, it is customarily the case that there is provided, on the opposite edge region of the flap opening, instead of a spindle drive, a pure gas pressure damper or gas pressure damper combined with a pressure spring (gas pressure spring) as so-called "passive side".

To equip a motor vehicle with a motor-operated spindle drive on the one hand and the above-described passive side on the other hand, it is thus always necessary for two different constructions to be produced, held available and mounted. This leads to an increased outlay in the production of a drive arrangement for a closure element of a motor vehicle.

SUMMARY

The problem underlying the disclosure is to reduce the production outlay for a drive arrangement having an active side and having a passive side.

The above problem is solved in a spindle drive as described herein.

What is key is the fundamental consideration that, for the passive side, there is provided a drive arrangement for a closure element of a motor vehicle, for example a tailgate, which, unlike in the prior art, does not have a completely different construction from the active side, but there is provided a construction which has substantially the same design as that of the active side and is in particular at least substantially structurally identical. Thus, according to the proposal, there is provided on the passive side, instead of a conventional gas pressure damper or a conventional gas pressure spring, a construction which, disregarding the motorized drive which is not present, comprises for the very most part the same components as the motor-operated spindle drive on the active side. This has the advantage that, to produce a drive arrangement for a closure element of a motor vehicle, which drive arrangement is intended to have an active side and a passive side, recourse can be had substantially to the same components, thereby considerably reducing the production outlay. It is also ensured when using the same components for active side and passive side that an equally high quality and service life of the two constructions can be achieved, since the individual components are already optimally tailored to one another, in particular as far as tolerances are concerned. The external dimensions and the external appearance of active side and passive side can also be selected to be identical. Yet a further advantage is that the bending stiffness in relation to a conventional gas pressure damper or the like is increased.

It is thus possible according to the proposal for especially the tube system of the motor-operated spindle drive provided on the active side to be adopted for the manual spindle drive on the passive side. Specifically, the proposed (manual or non-motor-operated) spindle drive of the passive side also has a tube-like drive housing and, in the drive housing along the spindle axis, a spindle unit with a spindle guide bush and a spindle movably mounted therein, a first drive connection and a second drive connection which is linearly displaceable or with respect to the latter being provided to generate the drive movements, a spindle guide tube being connected to the first drive connection and forming, together with the first drive connection, a first drivetrain component which is connected to the spindle guide bush of the spindle unit, and a connecting element being connected to the second drive connection and forming, together with the second drive connection, a second drivetrain component which is connected to the spindle of the spindle unit. By contrast with a (motor-operated) spindle drive of the active side, it is the case that in the proposed spindle drive the spindle is mounted in the spindle guide bush in such a way that it is purely linearly movable in the spindle guide bush. For this purpose, the spindle and/or spindle guide bush are/is in particular threadless.

In other words, in the case of the proposed spindle drive for the passive side, the spindle interacts with the spindle guide bush in such a way that the spindle can carry out a purely translational movement, that is to say a rotation-free movement, in the spindle guide bush. Although the spindle has no spindle external thread and/or the spindle guide bush has no spindle nut internal thread, the spindle and/or spindle guide bush of the proposed spindle drive can otherwise be structurally identical to the spindle or spindle guide bush of the active side. In particular, the same dimensions and/or the same material can be provided.

Various embodiments relate to possibilities of the structural design of the proposed spindle drive which optimize the fundamental operating principle of assisting an active side.

In some embodiments, the spindle drive has a spacer bush which forms or occupies a space, in particular annular space, in the drive housing. “Forms” means in this context that a free, that is say unfilled, space is created by the spacer bush, whereas “occupies” means that this space is filled by the spacer bush, that is to say the material of the spacer bush completely occupies this space. The space formed or occupied by the spacer bush can extend axially in a region between the second drive connection and the tubular spring guide and/or outer spring, the outer spring optionally bearing axially against the spacer bush. The spacer bush particularly fills the space which would be taken over by a spindle drive motor, and possibly downstream intermediate gear mechanism, in the case of a motor-operated spindle drive of the active side. The space formed or occupied by the spacer bush can have dimensions within which a spindle drive motor, and possibly downstream intermediate gear mechanism, of a drive unit is arranged. However, since the proposed spindle drive does not require a drive unit, in the case that the spacer bush forms a free space, there is in particular also no spindle drive motor and no intermediate gear mechanism arranged in the space.

In some embodiments, the spacer bush and a housing portion of the drive housing and/or the tubular spring guide are formed as a one-piece component, thereby further simplifying the assembly of a proposed spindle drive. The one-piece component particularly forms a spring-receiving tube which has a peripheral double wall, a receiving space for the outer spring being formed in the intermediate space between the inner and the outer wall. The outer wall is then a constituent part of the drive housing which, according to the proposal, can be of multipart design, in particular two-part design, with telescopic housing portions.

Various embodiments relate to a separate braking device of the spindle drive that assists in holding the closure element in the open position or in intermediate positions and in this way also correspondingly relieves the spindle drive of the active side. “Separate braking device” means here that it causes a braking action which occurs in addition to the necessarily occurring friction between spindle and spindle guide bush. Whereas already necessarily some friction occurs between spindle and spindle guide bush if a relative movement is carried out between spindle and spindle guide bush, and as a result a frictional engagement (frictional force) is generated which brings about braking of a movement of the spindle with respect to the spindle guide bush, the separate braking device assists the braking by virtue of the fact that it can generate a supplementary braking force, in particular a frictional force. Here, the supplementary braking force particularly has the decisive influence on the braking action, that is to say the supplementary braking force is in particular greater than the frictional engagement necessarily occurring between spindle and spindle guide bush.

According to some embodiments, a spacer bush is formed as a one-piece component together with a housing portion of the drive housing and/or of a tubular spring guide also in a spindle drive for the active side of a drive arrangement for a closure element of a motor vehicle. The one-piece component particularly forms a spring-receiving tube, as already described above, with a radially peripheral double wall, a receiving space for the outer spring being provided between inner wall and outer wall. Such a one-piece component or spring-receiving tube also simplifies the production of a motor-operated spindle drive which has a spindle unit in the form of a spindle/spindle nut mechanism and a drive unit with a drive motor which is connected downstream of the spindle/spindle nut mechanism in terms of drive.

According to some embodiments, a drive arrangement for a closure element of a motor vehicle with at least two spindle drives is disclosed, the first of the spindle drives being designed like the above-described manual spindle drive and having no drive unit. By contrast, a second of the spindle drives can have a drive unit with a drive motor which is connected downstream of the spindle unit in terms of drive. The second of the spindle drives can be otherwise structurally identical to the first of the spindle drives, that is to say that, in some embodiments, at least the tube-like drive housing, in particular the plurality of housing portions, and/or the spindle guide tube and/or the tubular spring guide and/or the outer spring and/or the inner spring are structurally identical in a first and second of the spindle drives.

In various embodiments of the drive arrangement, the second of the spindle drives is designed as described herein, that is to say as a motor-operator spindle drive with a one-piece component or spring-receiving tube comprising a spacer bush and a housing portion of the drive housing and/or a tubular spring guide which radially surrounds the spindle guide tube and/or the spindle. In this case, the spacer bush particularly forms a space which extends axially in a region between the second drive connection and the tubular spring guide and/or outer spring, the outer spring can be bearing axially against the spacer bush. A corresponding drive motor of a drive unit can then be arranged adjacent to the spacer bush or within the spacer bush.

For the sake of completeness, it should be pointed out that the second of the spindle drives of the drive arrangement, that is to say the spindle drive having the drive unit, can have one or more features described above with reference to the first (manual) spindle drive, in particular one or more of the features described above.

Various embodiments provide a spindle drive for a closure element of a motor vehicle for generating linear drive movements along a geometric spindle axis, wherein a tube-like drive housing and, in the drive housing along the spindle axis, a spindle unit with a spindle guide bush and a spindle movably mounted therein are provided, a first drive connection and a second drive connection which is linearly displaceable with respect to the latter being provided to generate the drive movements, a spindle guide tube being connected to the first drive connection and, together with the first drive connection, forming a first drivetrain component which is connected to the spindle guide bush of the spindle unit, and a connecting element being connected to the second drive connection and forming, together with the second drive connection, a second drivetrain component which is connected to the spindle of the spindle unit, wherein the spindle is mounted in the spindle guide bush in such a way that it is purely linearly movable in the spindle guide bush.

In some embodiments, the spindle guide bush and/or spindle are/is threadless.

In some embodiments, the spindle has a guide element on a spindle portion, in particular on the free end of the spindle, which is arranged within the spindle guide tube between the first drive connection and the spindle guide bush, which guide element supports the spindle on the spindle guide tube on the inner side, wherein the guide element is configured such that it allows or prevents a pressure equalization between the portion of the spindle guide tube situated axially upstream of the guide element and the portion of the spindle guide tube situated axially downstream of the guide element.

In some embodiments, the spindle guide bush is configured in such a way that it allows or prevents a pressure equalization between the interior of the spindle guide tube and the surroundings of the spindle guide tube.

In some embodiments, a tubular spring guide is provided in the drive housing along the spindle axis and radially surrounds the spindle guide tube and/or the spindle, wherein an outer spring, in particular pressure spring, which forms a drive element of the spindle drive and which axially preloads the first drive connection with respect to the second drive connection is mounted, along the spindle axis, at least in certain portions circumferentially on the tubular spring guide, and further wherein the outer spring is arranged in a radial interspace, in particular a radially peripheral interspace, between the tubular guide spring and the drive housing.

In some embodiments, an inner spring, in particular pressure spring, which forms a damping element of the spindle drive and which damps the linear movement of the spindle is mounted radially within the spindle guide tube along the spindle axis.

In some embodiments, a spacer bush is provided along the spindle axis and forms or occupies a space, in particular annular space, wherein the space formed or occupied by the spacer bush extends axially in a region between the second drive connection and the tubular spring guide and/or outer spring, and further wherein the outer spring bears axially against the spacer bush.

In some embodiments, the spacer bush and a housing portion of the drive housing and/or the tubular spring guide together form one-piece component.

In some embodiments, a separate braking device is provided which is configured to bring about braking of a relative movement between spindle and spindle guide bush, wherein the braking device is configured to exert a frictional force on the spindle.

Various embodiments provide a spindle drive for a closure element of a motor vehicle for generating linear drive movements along a geometric spindle axis, a tube-like drive housing and, in the drive housing along the spindle axis, a spindle unit with a spindle guide bush and a spindle movably mounted therein being provided, a first drive connection and a second drive connection which is linearly displaceable with respect to the latter being provided to generate the drive movements, a spindle guide tube being connected to the first drive connection and forming, together with the first drive connection, a first drivetrain component which is connected to the spindle guide bush of the spindle unit, and a connecting element being connected to the second drive connection and forming, together with the second drive connection, a second drivetrain component which is connected to the spindle of the spindle drive, there further being provision that the spindle drive has a drive unit with a drive motor which is connected downstream of the spindle drive in terms of drive, the spindle unit being designed as a spindle/spindle nut mechanism which has the spindle and the spindle guide bush as mechanism partners, the spindle being a spindle with a spindle external thread and the spindle guide bush being a spindle nut with a spindle nut internal thread, which form a screw engagement with one another, and the connecting element transmitting a rotational movement generated by the drive motor to the spindle, wherein a spacer bush is provided which, together with a housing portion of the drive housing and/or a tubular spring guide which radially surrounds the spindle guide tube and/or the spindle, forms a one-piece component along the spindle axis.

Various embodiments provide a drive arrangement for a closure element of a motor vehicle having at least two spindle drives for generating linear drive movements along in each case a geometric spindle axis, in each case a tube-like drive housing and, in the drive housing along the spindle axis, a spindle unit with a spindle guide bush and a spindle movably mounted therein being provided, a first drive connection and a second drive connection which is linearly displaceable with respect to the latter being provided in each case for generating the drive movements, in each case a spindle guide tube being connected to the first drive connection and forming, together with the first drive connection a first drivetrain component which is connected to the spindle guide bush of the spindle unit, and in each case a connecting element being connected to the second drive connection and forming, together with the second drive connection, a second drivetrain component which is connected to the spindle of the spindle unit, wherein a first of the spindle drives is designed as described herein and has no drive unit.

In some embodiments, a second of the spindle drives has a drive unit with a drive motor which is connected downstream of the spindle unit in terms of drive, wherein the spindle unit is designed as a spindle/spindle nut mechanism which has the spindle and the spindle guide bush as mechanism partners, the spindle being a spindle with a spindle external thread and the spindle guide bush being a spindle nut with a spindle nut internal thread, which form a screw engagement with one another, and further wherein the connecting element of the second of the spindle drives transmits a rotational movement generated by the drive motor to the spindle.

In some embodiments, the second of the spindle drives is otherwise structurally identical to the first of the spindle drives.

In some embodiments of the drive arrangement, the spindle drives is designed as described herein.

BRIEF DESCRIPTION OF THE DRAWINGS

The disclosure will be explained in more detail below with reference to a drawing illustrating only one exemplary embodiment. In the drawing.

DETAILED DESCRIPTION

Figure 1:
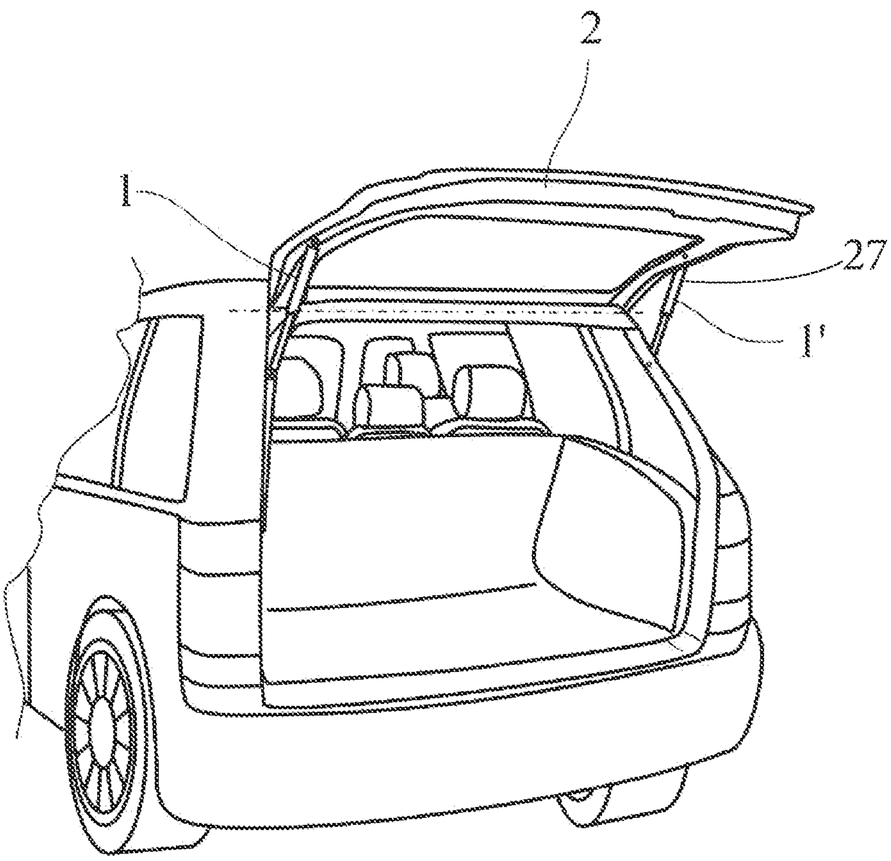
FIG. 1 shows, in a highly schematic illustration, the rear region of a motor vehicle having a proposed drive arrangement which has a proposed manual spindle drive and a proposed motor-operator spindle drive.

The spindle drives 1, 1' illustrated in the drawing serve for adjusting a closure element 2 of a motor vehicle, with, by way of example, the spindle drive 1 illustrated on the left in FIG. 1 being a manual spindle drive, that is to say a non-motor-operated spindle drive, and in this respect forming the passive side of the drive arrangement illustrated in FIG. 1 for a closure element 2, whereas the spindle drive 1' illustrated on the right in FIG. 1 is a motor-operated spindle drive and in this respect forms the active side of the drive arrangement. As regards the further understanding of the term "closure element", reference may be made to the introductory part of the description. In the text which follows, the disclosure will be explained on the basis of a closure element 2 designed as a tailgate.

The drive-side spindle drive 1' is equipped with a drive unit which is here electric and which has an electric drive motor 27 and an intermediate gear mechanism connected downstream of the drive motor. Connected downstream of the drive unit overall in terms of drive is a spindle unit 3 which is designed as a spindle/spindle nut mechanism. The spindle unit 3 comprises a spindle guide bush 4 configured as a spindle nut and a spindle 5 mounted movably therein for the purpose of generating linear drive movements between two drive connections 6, 7 along a geometric spindle axis 8. The drive connections 6, 7 are configured as ball sockets which are in engagement with corresponding vehicle-side ball heads. Spindle guide bush 4 and spindle 5 are here mounted in screw engagement with one another and in such a way that a rotational movement transmitted by the drive unit to the spindle 5 brings about a linear movement of the spindle guide bush 4 along the geometric spindle axis 8 relative to the spindle 5, which in turn causes the closure element 2, here the tailgate, to be adjusted between the open position illustrated in FIG. 1 and a closed position or intermediate positions, which is/are not illustrated.

The further spindle drive 1 is configured as a manual spindle drive and, in various embodiments does not have a drive motor. A further difference between the spindle drives 1 and 1' is that the manual spindle drive 1 has a spindle unit 3 with a spindle guide bush 4 and a spindle 5 mounted movably therein, which are mounted relative to one another in such a way that the spindle 5 can be moved purely linearly in the spindle guide bush 4, that is to say a displacement of the spindle 5 relative to the spindle guide bush 4 is possible without relative rotational movement between the two components 4, 5. For this purpose, the spindle guide bush 4 of the spindle unit 1 has no internal thread. Additionally or alternately, the spindle 5 is also threadless.

What is key then is that, as a result of the otherwise substantially identical design, such as an exactly identical design, of the spindle drives 1, 1', there is no need to provide a separate construction, especially a gas pressure damper or a gas pressure spring, for the passive side; rather, recourse can be had in the construction of the manual spindle drive 1 to the components already present per se through the motor-operated spindle drive 1'. This considerably simplifies the design of a drive arrangement having a manual and a motor-operated spindle drive 1, 1'.

Since, in the proposed solution, gas pressure dampers or gas pressure springs are dispensed with, but use is made for the passive side of an easily converted spindle drive which is customarily used on the active side, it is also possible for a power loss over the service life on the passive side to be minimized. There is also no appreciably increase in the friction, as in gas pressure dampers or the like, in the course of the service life. Finally, the proposed solution also produces an acoustic optimization.

Figure 2:
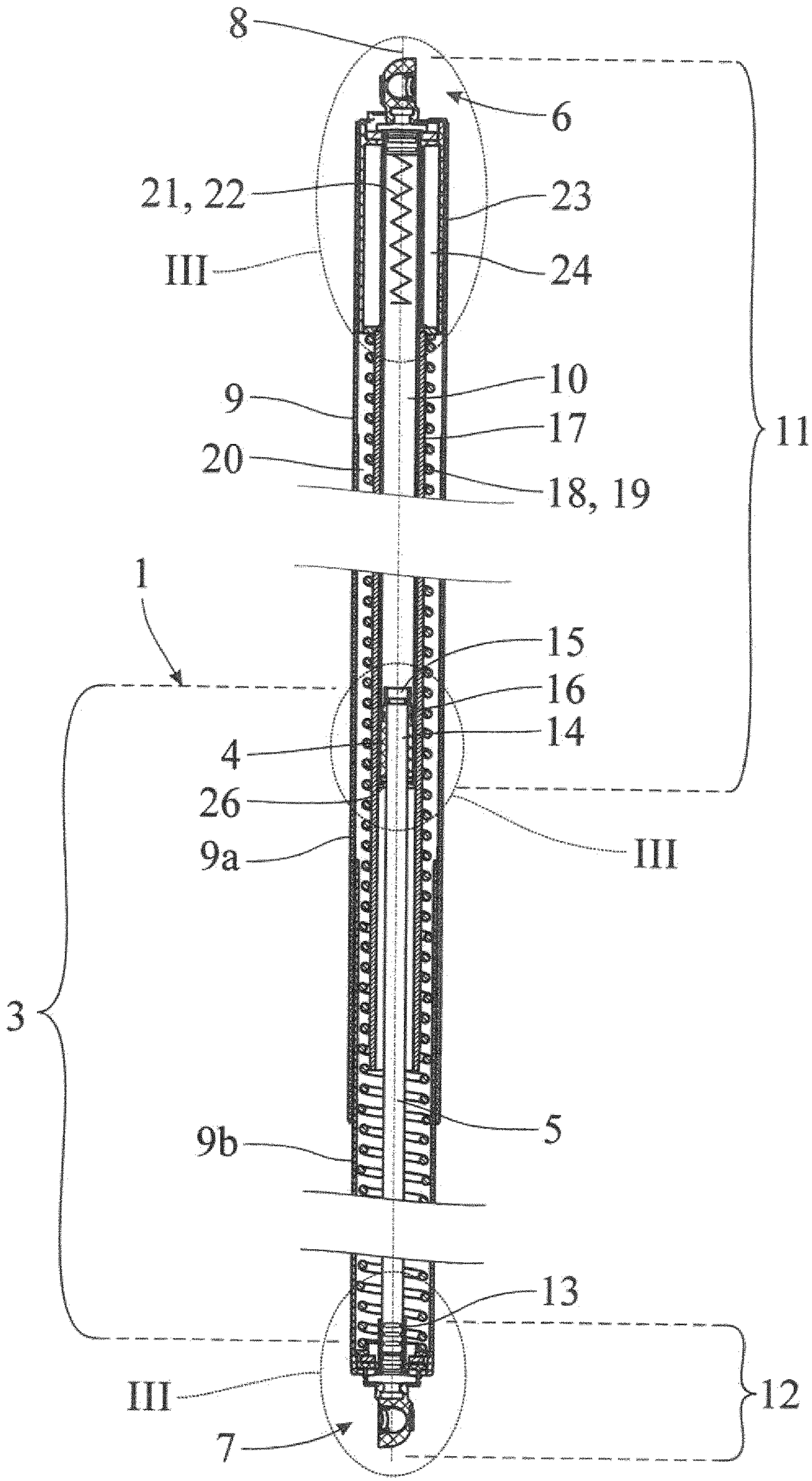
FIG. 2 shows, in a detail view, a first embodiment of a proposed spindle drive for a passive side in the extended state.
Figure 3A:
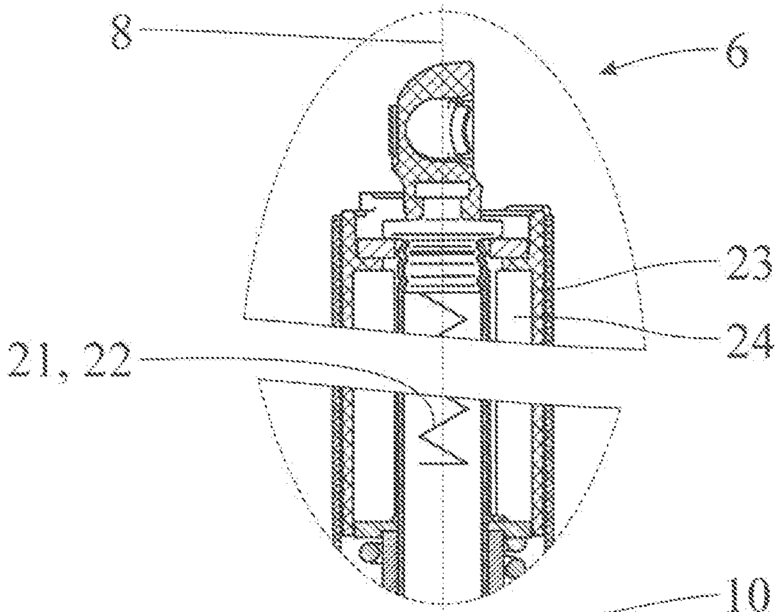
FIG. 3*a* shows enlarged details of the spindle drive from FIG. 2.

In the text which follows, the design of the proposed manual spindle drive 1 will be described in more detail on the basis of the embodiments in FIGS. 2 and 3 on the one hand and FIGS. 4 and 5 on the other hand.

In principle, according to both embodiments, the spindle drive 1 has, as already explained, a spindle unit 3 with a spindle guide bush 4 and a spindle 5 mounted movably therein, the spindle 5 being mounted in the spindle guide bush 4 so as to be purely linearly movable. The spindle unit 3 is surrounded in the radial direction by a tubular drive housing 9 which is in two parts here, a first housing portion 9*a*, also referred to as an outer tube, being linearly guided on a second housing portion 9*b*, also referred to as inner tube.

Furthermore, a spindle guide tube 10 is connected to the first drive connection 6 within the drive housing 9 and forms, together with the first drive connection 6, a first drivetrain component 11 which is connected to the spindle guide bush 4. A second drivetrain component 12 is formed by a connecting element 13 and the second drive connection 7 which is connected to the connecting element 13. The second drivetrain component is in turn connected to the spindle 5.

If then the spindle drive 1 is manually actuated by the two drive connections 6, 7 being displaced relative to one another, the spindle guide bush 4 is correspondingly moved concomitantly relative to the spindle 5.

Figure 3B:
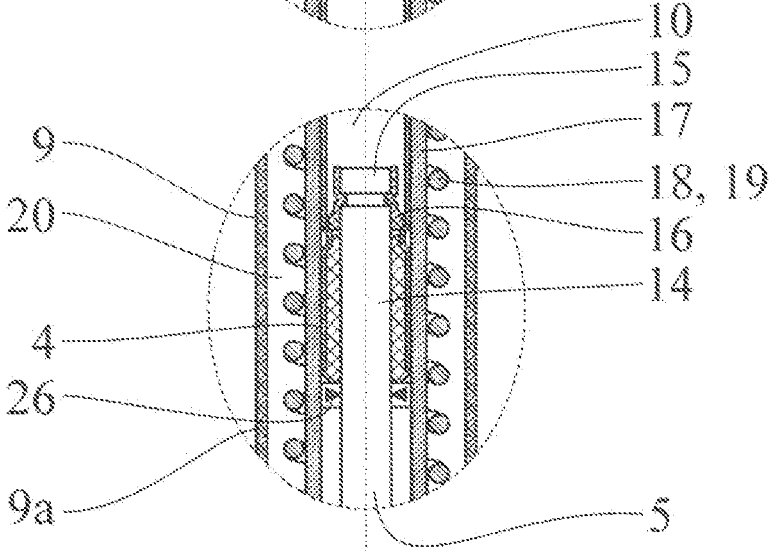
FIG. 3*b* shows enlarged details of the spindle drive from FIG. 2.
Figure 3C:
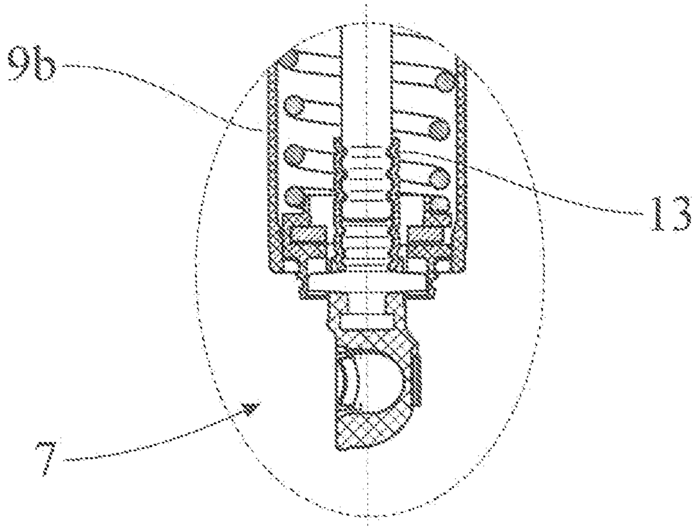
FIG. 3*c* shows enlarged details of the spindle drive from FIG. 2.

As can be seen particularly in FIG. 3*b*, the spindle 5 has a guide element 16 on a spindle portion 14, in particular on the free end 15 of the spindle 5, which is arranged within the spindle guide tube 10 between the first drive connection 6 and the spindle guide bush 4, which guide element supports the spindle 5 on the spindle guide tube 10 on the inner side. The guide element 16 is configured here in such a way that it allows a pressure equalization between the portion of the spindle guide tube 10 situated axially upstream of the guide element 16 and the portion of the spindle guide tubed 10 situated axially downstream of the guide element 16. In principle, however, it is also conceivable, according to a variant, that the guide element 16 bears in a sealing manner against the spindle 5 and the spindle guide tube 10 and in this respect prevents a pressure equalization and thus assumes a damping function.

The spindle guide bush 4 in turn is here configured in such a way that it allows a pressure equalization between the interior of the spindle guide tube 10 and the surroundings of the spindle guide tube 10. It is possible, here too, according to a further variant, for the spindle guide bush 4 to be configured in such a way that it prevents a pressure equalization and thus likewise ensures a damping function.

In the embodiments shown in FIGS. 2 to 5, a tubular spring guide 17 is also provided in the drive housing 9 along the spindle axis 8 and radially surrounds the spindle guide tube 10 and here also the spindle 5. An axial portion of an outer spring 18 is mounted circumferentially on the tubular spring guide 17, which spring forms a drive element 19 of the spindle drive 1 and axially preloads the first drive connection 6 with respect to the second drive connection 7. The outer spring 18 is a pressure spring 18 here. The outer spring 18 is arranged in a radially peripheral interspace 20 between the tubular spring guide 17 and the drive housing 9.

Also provided is a second, inner spring 21, which is also a pressure spring 21, which forms a damping element 22 of the spindle drive 1 and damps the linear movement of the spindle 5 in its end position or before reaching its end position. This inner spring 21 is mounted radially within the spindle guide tube 10.

The two embodiments in FIGS. 2 and 3 on the one hand and 4 and 5 on the other hand differ substantially only in terms of the spacer bush 23, 23' described in more detail below, which spacer bush in the one case forms (FIG. 3*a*) an annular space 24, which is here air-filled, and in the other case occupies (FIG. 5*a*), i.e. completely fills, an annular space 24'. The respective annular space 24, 24' extends axially in a region between the second drive connection 7 and the tubular spring guide 17 and the outer spring 18, the outer spring 18 here bearing axially against the respective spacer bush 23, 23'. The spacer bush 23, 23' makes it possible to compensate for or fill the insulation space which, in the case of a motor-operated spindle drive 1', would be filled by a drive motor and possibly an intermediate gear mechanism. In this way, the remaining components of the spindle drive 1, which are also provided in the spindle drive 1', do not need to be modified, but can be structurally identical. This applies in particular to one or more of the following components: drive housing 9, tubular spring guide 17, outer spring 18, inner spring 21 and spindle guide tube 10. In principle, it is also conceivable for the spindle guide bush 4 or the spindle 5 to likewise be designed in a structurally identical manner in relation to the other spindle drive 1' as long as it is ensured that the spindle 5 is also purely linearly movable in the spindle guide bush 4.

Figure 4:
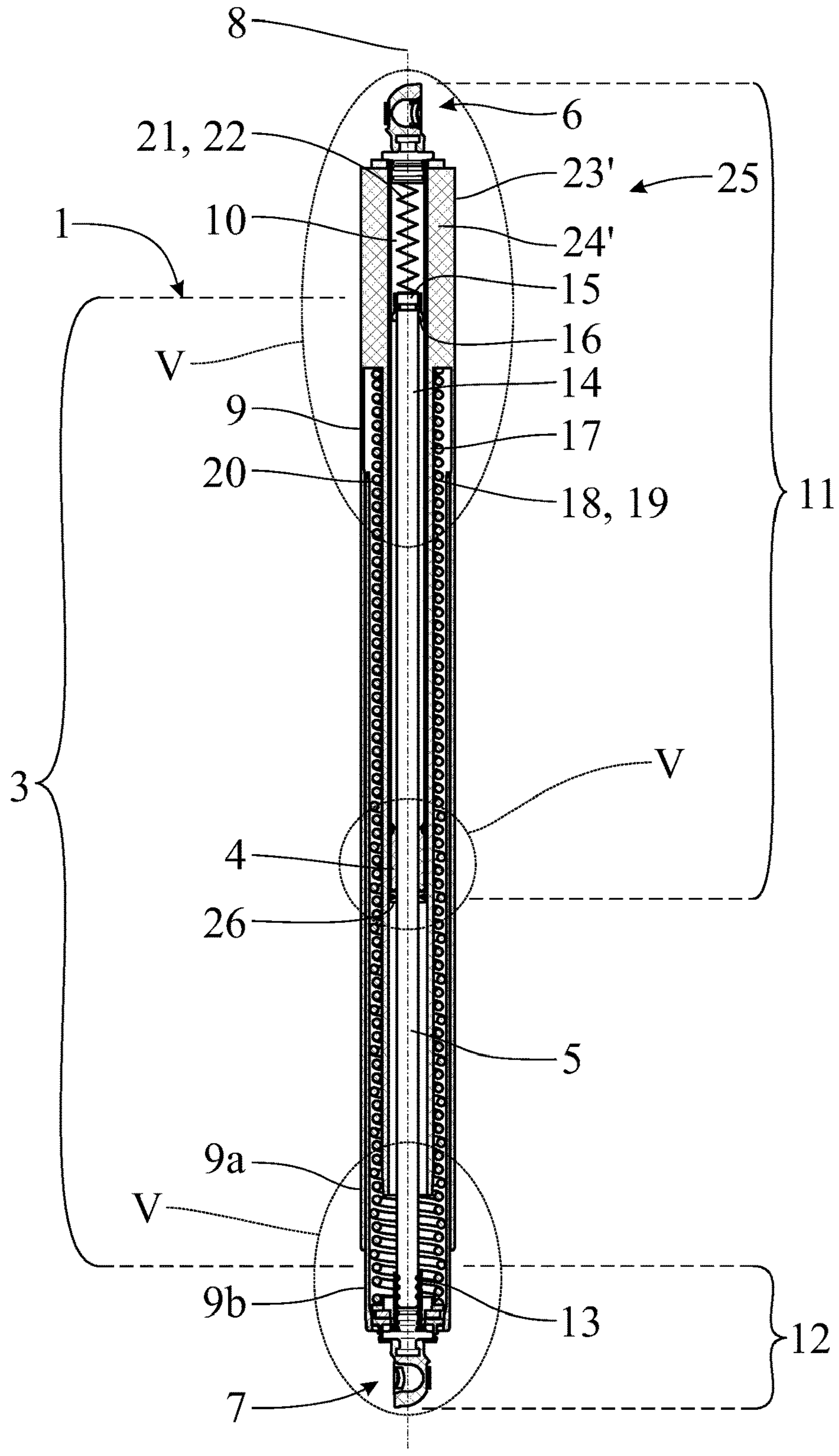
FIG. 4 shows, in a detail view, a second embodiment of a proposed spindle drive for the passive side in the retracted state.
Figure 5A:
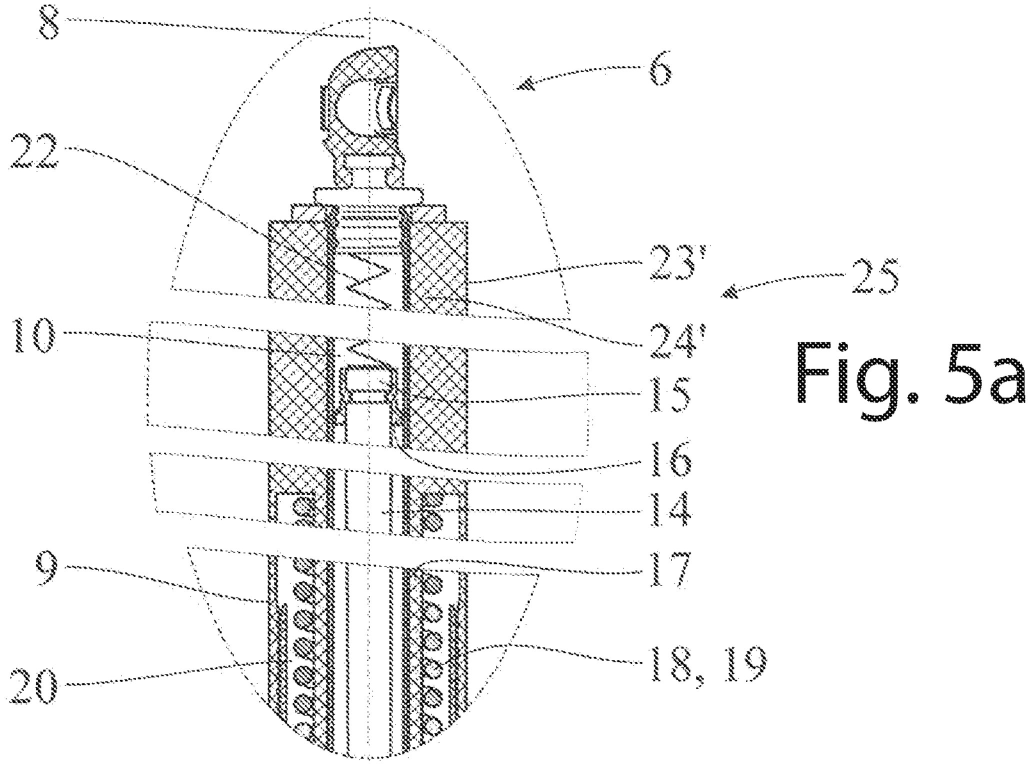
FIG. 5*a* shows enlarged details of the spindle drive from FIG. 4.
Figure 5B:
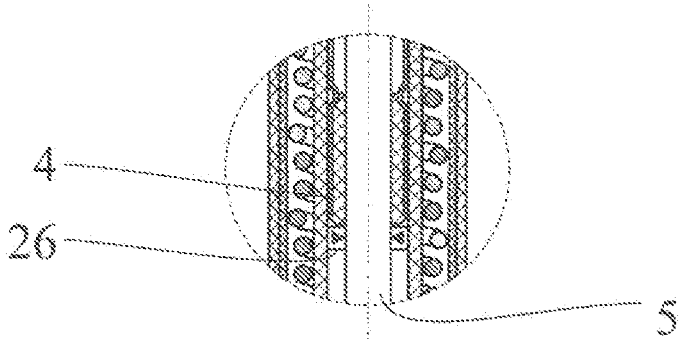
FIG. 5*b* shows enlarged details of the spindle drive from FIG. 4.
Figure 5C:
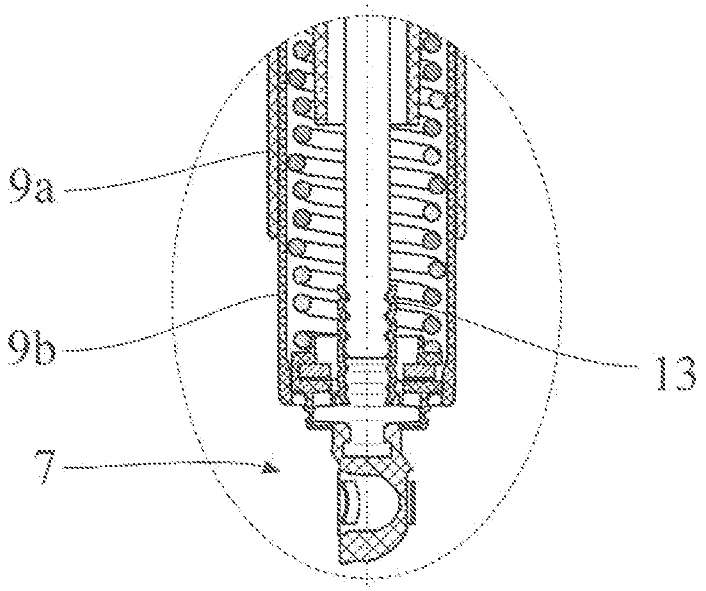
FIG. 5*c* shows enlarged details of the spindle drive from FIG. 4.

In the embodiment in FIGS. 4 and 5, the spacer bush 23', the housing portion 9*a* of the drive housing 9 and the tubular spring guide 17 are designed together in one piece (integrally), thus forming here a one-piece component 25 in the form of a spring-receiving tube. In this case, too, the remaining components of spindle drive 1 and spindle drive 1' can be structurally identical, which applies particularly to the outer spring 18, the inner spring 21 and/or the spindle guide tube 10. In principle, it is also conceivable here that the spindle guide bush 4 or the spindle 5 is additionally also structurally identical in relation to the other spindle drive 1' as long as a purely linear relative movement between spindle guide bush 4 and spindle 5 is ensured.

Furthermore, a separate braking device 26 can be provided in the manual spindle drive 1 according to FIGS. 2 to 5, which braking device brings about braking of a linear relative movement between spindle drive bush 4 and spindle 5, the braking can be a continuous braking. This is achieved in particular by a frictional force being exerted on the spindle 5 by friction-braking elements, which are not illustrated here for the sake of clarity.

Finally, there should also be described an embodiment of the motor-operated spindle drive 1' as can be provided on the left side of the motor vehicle illustrated in FIG. 1. In a similar manner to the manual spindle drive 1, the spindle drive 1' comprises a tube-like drive housing 9 and, in the drive housing 9 along the spindle axis 8, a spindle unit 3 with a spindle guide bush 4 and a spindle 5 movably mounted therein, a first drive connection 6 and a second drive connection 7 which is linearly displaceable with respect thereto being provided to generate the drive movements, a spindle guide tube 10 being connected to the first drive connection 6 and forming, together with the first drive connection 6, a first drivetrain component 11 which is connected to the spindle guide bush 4 of the spindle unit 3, and a connecting element 13 being connected to the second drive connection 7 and forming, together with the second drive connection 7, a second drivetrain component 12 which is connected to the spindle 5 of the spindle unit 3.

Here, however, by contrast with the manual spindle drive 1, and as has been stated, a drive unit with a drive motor is provided which is connected downstream of the spindle unit 3 in terms of drive. In addition, the spindle unit 3 is designed as a spindle/spindle nut mechanism which has the spindle 5 and the spindle guide bush 4 as mechanism partners, the spindle 5 being a spindle with a spindle external thread and the spindle guide bush 4 being a spindle nut with a spindle nut internal thread, which form a screw engagement with one another. The connecting element 13, which can be a constituent part of the drive motor or of an intermediate gear mechanism of the drive unit, here transmits a rotational movement generated by the drive motor to the spindle 5.

It is optionally possible, as also in the manual spindle drive 1, for a spacer bush 23, 23' to be provided along the spindle axis 8, which spacer bush forms a one-piece component 25 together with a housing portion 9*a* of the drive housing 9 and/or a tubular spring guide 17 which radially surrounds the spindle guide tube 10 and/or the spindle 5.

The invention claimed is:

1. A spindle drive for moving a closure element of a motor vehicle, comprising:
- a tubular drive housing,
- a spindle, and,
- in the tubular drive housing along a geometric spindle axis of the spindle, a spindle unit with a spindle guide bush and the spindle movably guided in the spindle guide bush,
- a first drive connection and a second drive connection which is linearly displaceable with respect to the first drive connection so as to allow linear drive movements relative to each other along the spindle axis,
- a spindle guide tube being connected to the first drive connection and, together with the first drive connection, forming a first drivetrain component which is connected to the spindle guide bush of the spindle unit, and
- a connecting element being connected to the second drive connection and forming, together with the second drive connection, a second drivetrain component which is connected to the spindle,
- wherein the spindle is mounted in the spindle guide bush in such a way that the spindle is exclusively linearly movable in the spindle guide bush,
- wherein the spindle drive further comprises a tubular spring guide in the tubular drive housing, the tubular spring guide extends along the spindle axis, wherein the tubular spring guide radially surrounds the spindle guide tube and the spindle,
- wherein an outer spring, which forms a drive element of the spindle drive and which exerts an axial spring load on the first drive connection and the second drive connection, is mounted along the spindle axis, at least with certain portions of the outer spring circumferentially on the tubular spring guide,
- wherein the tubular spring guide and the spindle guide tube are connected to the first drive connection,
- wherein the tubular spring guide is disposed within the outer spring.

2. The spindle drive as claimed in claim 1, wherein at least one of the spindle guide bush and the spindle is completely threadless.

3. The spindle drive as claimed in claim 1, wherein the spindle has a guide element on a spindle portion, wherein the guide element is arranged within the spindle guide tube between the first drive connection and the spindle guide bush, wherein the guide element supports the spindle on the inner side of the spindle guide tube.

4. The spindle drive as claimed in claim 3, wherein the guide element is configured such that the guide element allows a pressure equalization between a portion of the spindle guide tube situated axially on one side of the guide element and a portion of the spindle guide tube situated axially on an opposite side of the guide element.

5. The spindle drive as claimed in claim 3, wherein the guide element is configured such that the guide element prevents a pressure equalization between a portion of the spindle guide tube situated axially on one side of the guide element and a portion of the spindle guide tube situated axially on an opposite side of the guide element.

6. The spindle drive as claimed in claim 1, wherein the spindle guide bush is configured in such a way that the spindle guide bush allows a pressure equalization between an interior of the spindle guide tube and a surrounding of the spindle guide tube.

7. The spindle drive as claimed in claim 1, wherein an inner spring which forms a damping element of the spindle drive and which damps a linear movement of the spindle is mounted within the spindle guide tube along the spindle axis.

8. The spindle drive as claimed in claim 1, wherein a spacer bush is provided along the spindle axis and occupies a space.

9. The spindle drive as claimed in claim 8, wherein the space occupied by the spacer bush extends axially in a region between the first drive connection and the tubular spring guide or in a region between the first drive connection and the outer spring, and wherein the outer spring bears axially against the spacer bush.

10. The spindle drive as claimed in claim 1, wherein a braking device is provided which is configured to bring about braking of a relative movement between the spindle and the spindle guide bush in addition to a necessarily occurring friction between the spindle and the spindle guide bush.

11. The spindle drive as claimed in claim 10, wherein the braking device is configured to exert a frictional force on the spindle.

12. The spindle drive as claimed in claim 1, wherein the outer spring is arranged in a radial interspace between the tubular spring guide and the tubular drive housing.

13. The spindle drive as claimed in claim 1, wherein the spindle guide bush is configured in such a way that the spindle guide bush prevents a pressure equalization between an interior of the spindle guide tube and a surrounding of the spindle guide tube.

14. A drive arrangement for moving a closure element of a motor vehicle having at least a first spindle drive and a second spindle drive, wherein the first spindle drive comprises a tubular drive housing, a spindle, and, in the tubular drive housing along a geometric spindle axis of the spindle, a spindle unit with a spindle guide bush and the spindle movably guided in the spindle guide bush, a first drive connection and a second drive connection which is linearly displaceable with respect to the first drive connection so as to allow linear drive movements relative to each other along the spindle axis, a spindle guide tube being connected to the first drive connection and, together with the first drive connection, forming a first drivetrain component which is connected to the spindle guide bush of the spindle unit, and a connecting element being connected to the second drive connection and forming, together with the second drive connection, a second drivetrain component which is connected to the spindle, wherein the spindle is mounted in the spindle guide bush in such a way that the spindle is exclusively linearly movable in the spindle guide bush, wherein the first spindle drive further comprises a tubular spring guide in the tubular drive housing, the tubular spring guide extends along the spindle axis, wherein the tubular spring guide radially surrounds the spindle guide tube and the spindle, wherein an outer spring, which forms a drive element of the first spindle drive and which exerts an axial spring load on the first drive connection and the second drive connection, is mounted along the spindle axis, at least with certain portions of the outer spring circumferentially on the tubular spring guide, wherein the tubular spring guide and the spindle guide tube are connected to the first drive connection, wherein the tubular spring guide is disposed within the outer spring, wherein the second spindle drive comprises:

a tubular drive housing, a spindle, and, in the tubular drive housing of the second spindle drive along a geometric spindle axis of the spindle of the second spindle drive, a spindle unit with a spindle guide bush and the spindle of the second spindle drive which is movably guided in the spindle guide bush of the second spindle drive, wherein the second spindle drive comprises a first drive connection and a second drive connection which is linearly displaceable with respect to the first drive connection of the second spindle drive for allowing linear drive movements relative to each other along the spindle axis of the second spindle drive, wherein the second spindle drive comprises a spindle guide tube being connected to the first drive connection of the second spindle drive and forming, together with the first drive connection of the second spindle drive, a first drivetrain component which is connected to the spindle guide bush of the second spindle drive, and wherein the second spindle drive comprises a connecting element being connected to the second drive connection of the second spindle drive and forming, together with the second drive connection of the second spindle drive, a second drivetrain component which is connected to the spindle of the second spindle drive, wherein the first spindle drive has no drive unit with a drive motor.

15. The drive arrangement as claimed in claim 14, wherein the second spindle drive comprises a drive unit with a drive motor for driving the spindle of the second spindle drive.

16. The drive arrangement as claimed in claim 15, wherein the spindle of the second spindle drive includes a spindle external thread and the spindle guide bush of the second spindle drive includes a spindle nut internal thread, wherein the spindle external thread and the spindle nut internal thread form a screw engagement with one another.

17. The drive arrangement as claimed in claim 16, wherein the connecting element of the second spindle drive transmits a rotational movement generated by the drive motor to the spindle of the second spindle drive.

* * * * *